United States Patent Office 2,776,313
Patented Jan. 1, 1957

2,776,313

PROCESS FOR MAKING N,N-DIALKYL-p-AMINOPHENOL

Gerald R. Lappin and Marshall R. Brimer, Kingsport, Tenn., assignors to Eastman Kodak Company, Rochester, N. Y., a corporation of New Jersey No Drawing. Application February 2, 1955, Serial No. 485,804

2 Claims. (Cl. 260—574)

This invention relates to an improved method of making N,N-di-alkyl-p-aminophenols useful as gum inhibitors for gasoline.

The N,N-di-alkyl-p-aminophenols are effective materials for inhibiting gum formation in motor fuels and particularly gasolines containing cracked stock, whether used alone as described in Rosenwald and Chenicek U. S. Patent 2,250,501 or in synergistic mixtures with N-monoalkyl-p-aminophenols as described in the copending application of Marshall R. Brimer, Serial No. 486,001, filed February 3, 1955. In such N,N-di-alkyl-p-aminophenols, the alkyl groups can be the same, but desirably differ from each other either in the number of carbon atoms or structural configuration or both. By structural configuration is meant the configuration of the carbon chain in the hydrocarbon group.

Prior to this invention, Rosenwald and Chenicek in U. S. 2,250,501 described a preparation of N,N-di-alkyl-p-aminophenols by a stepwise alkylation of p-aminophenol with two different alkyl chlorides or alkyl sulfates in the presence of an alkaline condensing agent.

A number of methods have also been proposed for preparing N-monoalkyl-p-aminophenols, but such methods were not satisfactory for preparing the desired N,N-di-alkyl-p-aminophenols. Buc U. S. Patent 1,555,452 describes the preparation of N-isopropyl-p-aminophenol by the interaction of isopropyl chloride and p-aminophenol. Major U. S. Patent 2,000,034 described the preparation of N-sec. alkyl-p-aminophenols by the reduction of N-isoalkylidene-p-aminophenols.

Major, J. Am. Chem. Soc., 53, 1901 (1931) showed that N-sec. alkyl-p-aminophenols could be prepared by the catalytic reduction at room temperature of a mixture of p-nitro- or nitrosophenol and a ketone in the presence of a platinum catalyst.

Fitch U. S. Patent 2,249,352 showed that N-primary-alkyl-p-aminophenols could be prepared by reacting a p-nitrophenol or a p-nitrosophenol with an aliphatic aldehyde under hydrogen pressure in the presence of a hydrogenation catalyst. While this process can be carried forward to produce some dialkylated p-aminophenol as we have found, the product is a mixture of mono- and dialkylated p-aminophenols and hence it is necessary to separate the mixture if only the dialkylated product is desired and the yield is lower than is economically desirable. Since, as indicated hereinabove, mixtures of monoalkylated and dialkylated p-aminophenols have been found to have synergistic inhibiting activity, this provided one way of obtaining such mixtures. The process possessed several distinct disadvantages, however, which were overcome by means of the present invention. The process was difficult to control so as to get the proper ratio of monoalkylated and dialkylated material for optimum synergistic activity. Objectionable catalyst poisoning was encountered, and the process was not economical to operate. Furthermore, the alkyl groups were both the same in the dialkylated material, whereas the preferred dialkylated materials were those containing different alkyl groups. Consequently, it was desirable to provide an improved process for preparing dialkylated p-aminophenols.

In U. S. Patent 2,270,215, Fitch described the preparation of N-monoalkyl-p-aminophenols by reacting approximately equimolar proportions of p-aminophenol with an alkyl aldehyde in the presence of hydrogen and a hydrogenation catalyst. This process of monoalkylation proceeded through an intermediate N-alkylidene p-aminophenol which was concomitantly hydrogenated to the corresponding N-alkyl-p-aminophenol. Fitch indicated that, when larger amounts of the aldehyde were employed, the excess aldehyde was reduced to the corresponding alcohol rather than forming dialkylated material in his process.

Unexpectedly, we have found that N,N-dialkyl-p-aminophenols can be readily prepared in high yield by reacting an N-monoalkyl-p-aminophenol with an aliphatic aldehyde in the presence of hydrogen and a hydrogenation catalyst. The exact mechanism of the reaction is not clear, but the process of the invention is in sharp contrast to that wherein p-aminophenol goes to monoalkyl-p-aminophenols through the alkylidene intermediate, which appears to merely convert excess aldehyde to alcohol. While alcohol is liberated in the present process using an alkyl aldehyde, the conversion of the monoalkylated p-aminophenol to dialkylated p-aminophenol can be readily carried substantially to completion. In the case of formaldehyde in the process of this invention, water is liberated during the alkylation. In the case of alkylation using an alkyl aldehyde in accordance with the invention, it appears that substantially anhydrous conditions are necessary for the process to proceed satisfactorily, although this is not the case with formaldehyde. Thus in practicing the invention, an N-alkyl-p-aminophenol is reacted with an aldehyde of the formula

R—CHO wherein R is either hydrogen or an alkyl group of 1–5 carbon atoms; and it appears that when R is an alkyl group, an alcohol R—OH is liberated and the reaction must be carried out in the absence of any substantial amount of water for optimum results. Desirably, the reaction is carried out either in the absence of a solvent in which case a liquid of the formula RCH₂OH, wherein R corresponds to the R in the aldehyde, is evolved, or else a solvent vehicle of the formula RCH₂OH is employed wherein R corresponds to the R in the aldehyde being used.

Thus, this invention has for an object the provision of a new and improved process of readily preparing in high yield any desired N,N-di-alkyl-p-aminophenol wherein the alkyl groups can be the same or different groups as desired. Another object of the invention is to provide a process for preparing N,N-di-alkyl-p-aminophenols which is not subject to the disadvantages inherent in many of the processes heretofore known. Other objects attained by means of this invention in addition to those herein specifically set out will be apparent from the description and claims which follow.

In practicing this invention, any of the N-alkyl-p-aminophenols can be used containing from 1 to 15 carbon atoms in the alkyl group, although those wherein the alkyl group contains 1–6 carbon atoms are desirably employed. The alkyl group can be either a straight or a branched chain alkyl group. This monoalkylated material is reacted with an aliphatic aldehyde containing 1–6 carbon atoms, i. e. either formaldehyde or an alkyl aldehyde wherein the alkyl group contains 1–5 carbon atoms. The hydrocarbon portion of the aldehyde can be the same as that of the alkyl group in the N-alkyl-p-aminophenol being converted, although it desirably differs therefrom either in number of carbon atoms or structural configuration or both. Thus the N-alkyl-p-aminophenols which are suitably employed in practicing the invention include but are not limited to N-methyl-p-aminophenol, N-ethyl-p-aminophenol, N-n-propyl-p-aminophenol, N-isopropyl-p-aminophenol, N-n-butyl-p-aminophenol, N-isobutyl-p-aminophenol, N-hexyl-p-aminophenol and the like. Similarly the aldehydes which can be employed include but are not limited to formaldehyde, acetaldehyde, propionaldehyde, n-butyraldehyde, isobutyraldehyde, n-valeric aldehyde, isovaleric aldehyde, 2-methyl butyraldehyde and the like.

When the aldehyde employed is formaldehyde, it can be used in the form of aqueous formaldehyde solution or para-formaldehyde as desired. The aldehyde, whether formaldehyde or an alkyl aldehyde, is desirably added slowly during the course of the reaction for optimum results, although all of the aldehyde can be added to the initial reaction mixture with good results. The aldehyde to p-alkylaminophenol ratio is preferably about 1:1 on a molar basis, although smaller or larger amounts can be used with less advantageous results. Thus as much as 5 moles of the aldehyde can be used for each mole of p-alkylaminophenol, although this is less desirable due to increased formation of tarry products. Amounts of less than 1 molar proportion of aldehyde can be used, although the yield of dialkylated product is thereby reduced and it is usually not desired to use less than about 0.5 mole of aldehyde for each mole of p-alkylaminophenol.

In effecting the alkylation of the invention, the monoalkyl aminophenol is preferably N-propyl-p-aminophenol, N-isopropyl-p-aminophenol, or N-n-butyl-p-aminophenol because of the desirable combination of physical properties and inhibiting potency of the resulting products, although other p-alkylaminophenols can be used as described. With the preferred p-alkylaminophenols, best results are obtained when the hydrocarbon portion of the aldehyde differs from the alkyl group either in chain configuration or number of carbon atoms or both. Thus, formaldehyde can be advantageously employed with the preferred p-alkylaminophenols to give such highly potent dialkylated inhibitors as N-methyl-N-propyl-p-aminophenol, N-methyl-N-isopropyl-p-aminophenol and N-methyl - N - n - butyl - p - aminophenol. Acetaldehyde can also be employed to prepare such materials as N-ethyl - N - propyl - p - aminophenol, N - ethyl - N - isopropyl-p-aminophenyl, and N-ethyl-N-n-butyl-p-aminophenol. One of the most highly preferred aldehydes is isobutyraldehyde which can be used to form N-propyl-N-isobutyl-p-aminophenol or N-isopropyl-N-isobutyl-p-aminophenol, but which is desirably employed to prepare N-n-butyl-N-isobutyl-p-aminophenol which is particularly useful in synergistic mixtures with N-n-butyl-p-aminophenol, particularly when admixed with minor amounts of N,N'-di-n-butyl-p-phenylene diamine. One of the primary advantages of the preferred derivatives derived with formaldehyde is the fact that the products obtained are liquids which are readily miscible with gasoline, whereas the original p-alkylaminophenols are solids.

In practicing the invention, the preferred hydrogenation catalyst is Raney nickel, although other hydrogenation catalysts such as supported nickel catalysts, platinum or palladium catalysts, copper chromite catalysts and the like can be employed. The choice of operating conditions depends largely on the catalyst used. If the catalyst used is the preferred Raney nickel, the process can be operated successfully over a temperature range of 25° C. to 150° C. or higher with hydrogen pressures of 500 to 5000 p. s. i. The time required to complete the process will vary with the temperature and the pressure, and an increase in either of these variables will decrease the time required for the process. With Raney nickel catalyst, the preferred conditions are a temperature of 40° C. to 100° C. and hydrogen pressures of 1000 p. s. i. to 2500 p. s. i. Under these conditions, the process requires from about 30 minutes to 2 hours to go to completion when carried out batchwise in a standard rocking autoclave. With a supported nickel catalyst, longer times are required and an operating temperature of 100° to 150° C. is required. Copper chromite catalysts require an operating temperature of 125° to 175° C. Platinum and palladium catalysts, on the other hand, can be used at temperatures of 25° to 50° C. with hydrogen pressures as low as 15–150 p. s. i.

When an alkyl aldehyde is employed, it is desirable to carry out the process in a solvent, and best results are obtained using an aliphatic alcohol corresponding to the alcohol liberated during the process. Quite unexpectedly, it was found that the process employing the alkyl aldehydes proceeds much more effectively in the presence of small amounts of an alkyl monocarboxylic acid. This acid, such as acetic acid or isobutyric acid, can be added to the reaction mixture. In many cases, however, the crude aldehyde contains free acid present, and it is thus desirable to use the crude aldehyde rather than a purified aldehyde. This not only gives optimum results, but is of considerable economic advantage due to the cost saving in the use of crude aldehyde.

The invention is illustrated by the following examples of preferred embodiments thereof.

*Example 1*

A mixture of 76 g. (0.5 mole) of N-n-butyl-p-aminophenol, 51 g. (0.5 mole) of 36% aqueous formaldehyde, and 5 g. of Raney nickel was charged into a rocking autoclave which was then pressured to 100 p. s. i. with hydrogen. The temperature was raised to 40° C. and the autoclave was rocked for 30 minutes. After cooling, the pressure was released and the contents were distilled under reduced pressure to give 60 g. of a slightly viscous yellow oil consisting predominantly of N-methyl-N-n-butyl-p-aminophenol and having a boiling point of 142–145° C. at 1 mm. pressure. When tested by the Active Oxygen Method (AOM) as an inhibitor in cracked gasoline, the product showed an antioxidant potency of 1.25 times as great as the original N-n-butyl-p-aminophenol. This material not only shows high inhibiting potency alone but also exhibits synergistic activity when blended with N-n-butyl-p-aminophenol. Thus a blend of 1 part of N-methyl-N-n-butyl-p-aminophenol and 3 parts of N-n-butyl-p-aminophenol was tested for inhibitor activity at a 0.01% concentration in a Pennsylvania blend of catalytic and thermal cracked gasoline. Using N-n-butyl-p-aminophenol as the standard with an inhibitor ratio taken as 1.00, the inhibitor ratio of the blend was found to be 1.11 whereas the calculated inhibitor ratio from the activity of the individual components was only 1.057.

*Example 2*

In the preceding example, aqueous formaldehyde was employed, but the process can be effected in the absence of a solvent using p-formaldehyde if desired. Thus, 76 g. of N-n-butyl-p-aminophenol, 15 g. of p-formaldehyde and 5 g. of Raney nickel were charged into a rocking autoclave which was pressured to 1000 p. s. i. with hydrogen. The reaction was effected at 40° C. in 30 minutes, the autoclave cooled and vented, and the mixture was distilled under reduced pressure. The product obtained weighed 63 g., and it exhibited 1.24 times the antioxidant potency of the original N-n-butyl-p-aminophenol.

*Example 3*

In the preceding examples, the reactants were all charged to the autoclave initially. Particularly good results are obtained when the aldehyde is added during the course of the reaction. For example, a mixture of 76 g. of N-n-butyl-p-aminophenol and 5 g. of Raney nickel was placed in the rocking autoclave which was then pressured to 1000 p. s. i. with hydrogen and heated to 55° C.

Without releasing the pressure, a total of 50 g. of 36% aqueous formaldehyde was added to the autoclave in 10 g. portions at 10 minute intervals. After cooling, the product was distilled under reduced pressure to give 71 g. of a yellow oil having an antioxidant potency of 1.26 times that of the original N-n-butyl-p-aminophenol.

Example 4

Similar results are obtained with other hydrogenation catalysts. Thus, 15.2 g. (0.1 mole) of N-n-butyl-p-aminophenol, 150 ml. of ethanol, 10 g. of 36% aqueous formaldehyde and 0.1 g. of platinum black were stored at 25° C. under 50 p. s. i. hydrogen pressure for 3 hours. After distillation, the N-methyl-N-n-butyl-p-aminophenol product was identical in potency with the product obtained in Eample 1.

Example 5

It is often desirable to employ synergistic blends of monoalkylated and dialkylated p-aminophenols, containing minor amounts of N,N'-dialkyl-p-phenylene diamine, as gum inhibitor compositions. One of the advantages of the present invention resides in the fact that the well known mixtures of monoalkylated-p-aminophenol and N,N'-dialkyl-p-phenylene diamine can be alkylated in accordance with the invention and then blended with additional amounts of the original base mixture. Thus, a mixture of 76 g. of a base mixture of 90% p-butylaminophenol and 10% N,N'-dibutyl-p-phenylene diamine with 51 g. of 36% aqueous formaldehyde and 5 g. of Raney nickel was charged into a rocking autoclave which was pressured to 1000 p. s. i. with hydrogen. Reaction was effected in 30 minutes at 40° C., and the product, after distillation, was a yellow oil having an antioxidant potency of 1.22 times that of the original base material. When blended with additional base mixture, a synergistic blend was obtained having excellent solubility in gasoline and a much lower precipitation temperature than the base mixture.

Example 6

N-n-butyl-p-aminophenol is desirably used in the conversion of the invention because of its ready commercial availability. Other monoalkylated p-aminophenols can be used, however, with equally good results. Thus, a mixture of 70 g. of p-propylaminophenol, 51 g. of 36% aqueous formaldehyde and 5 g. of Raney nickel was reacted for 30 minutes at 40° C. under hydrogen pressure of 1000 p. s. i. The product, after distillation, weighed 50 g. and was a yellow oil consisting essentially of N-methyl-N-propyl-p-aminophenol and having 1.22 times the antioxidant potency of the original p-propylaminophenol.

Example 7

A base mixture of 9 parts of N-n-butyl-p-aminophenol and 1 part of N,N'-di-n-butyl-p-phenylene diamine was reacted with approximately an equimolar amount of crude isobutyraldehyde in isobutanol in accordance with the process of Example 1 using a Raney nickel catalyst and hydrogen pressure of about 1000 p. s. i. After completion, the reaction mixture was filtered, the low boiling components distilled off and the crude product was distilled at 2 mm. pressure. The distilled product consisting predominantly of N-n-butyl-N-isobutyl-p-aminophenol had an antioxidant potency of 0.985 that of the original base mixture. When 1 part of the distilled product was blended with 1 part of the base mixture, however, the resulting blend had an inhibitor ratio of 1.068 based on the base mixture taken as 1.00. This inhibitor ratio was in contrast to the calculated inhibitor ratio of 0.982.

Example 8

Other alkyl aldehydes also can be used in practicing the invention. Thus, acetaldehyde was substituted for isobutyraldehyde in the process of the preceding example to obtain N-ethyl-N-n-butyl-p-aminophenol. Although this product had an inhibiting potency of approximately the same value as the base mixture, a 50:50 blend of the N-ethyl-N-n-butyl-p-aminophenol product with the base mixture had an inhibitor ratio of 1.065 whereas the calculated potency from the potency of the individual components was only 1.005.

Similar results are obtained with other reaction mixtures within the invention as described herein. Thus, by means of this invention N,N-di-alkyl-p-aminophenols are readily prepared from N-alkyl-p-aminophenols. The process is versatile so that the product can contain the same or different alkyl groups. When formaldehyde is employed, aqueous formaldehyde solutions can be used with considerable economic advantage. When alkylaldehydes are employed, best results are obtained with crude aldehydes which is of considerable importance from the cost standpoint. The process is readily carried to completion whereby the product can be used alone if desired, or blended with monoalkylated material in any desired ratio.

Although the invention has been described in detail with particular reference to certain preferred embodiments thereof, variations and modifications can be effected within the spirit and scope of the invention as described hereinabove and as defined in the appended claims.

We claim:

1. The method which comprises reacting, at 40–100° C., and in the presence of Raney nickel catalyst, isobutyraldehyde containing an alkyl monocarboxylic acid and a member of the group consisting of N-propyl-p-aminophenol, N-isopropyl-p-aminophenol and N-n-butyl-p-aminophenol, in isobutanol and under hydrogen pressure of 1000–2500 p. s. i.

2. The method which comprises reacting, at 40–100° C., and in the presence of Raney nickel catalyst, crude isobutylraldehyde containing alkyl monocarboxylic acid and N-n-butyl-p-aminophenol containing about 10% by weight of N,N'-di-n-butyl-p-phenylene diamine, in isobutanol and under hydrogen pressure of 1000–2500 p. s. i.

References Cited in the file of this patent

UNITED STATES PATENTS 2,380,420    Emerson _____ July 31, 1945